United States Patent [19]

Wilkes et al.

[11] 3,897,018
[45] July 29, 1975

[54] METHOD AND APPARATUS FOR THE CONTINUOUS FEEDING OF PALLETIZED FIBER MATERIALS

[75] Inventors: Lambert H. Wilkes; Gary L. Underbrink, both of College Station, Tex.; Joseph K. Jones, Raleigh, N.C.

[73] Assignee: Cotton, Incorporated, New York, N.Y.

[22] Filed: Feb. 6, 1974

[21] Appl. No.: 439,846

[52] U.S. Cl. ................ 241/223; 214/310; 241/235
[51] Int. Cl. ............................................. B65b 69/00
[58] Field of Search ............ 241/235, DIG. 29, 223, 241/279–282; 214/10, 309, 300, 310, 83.28, 83.14; 131/146, 149, 136, 110; 198/36; 239/650, 672; 225/97

[56] References Cited
UNITED STATES PATENTS
3,125,231  3/1964  Mortland ............................ 198/36
3,195,746  7/1965  Heubach ......................... 214/83.28

FOREIGN PATENTS OR APPLICATIONS
1,130,345  5/1962  Germany ......................... 131/149

Primary Examiner—Robert J. Spar
Assistant Examiner—Lawrence J. Oresky
Attorney, Agent, or Firm—Burns, Doane, Swecker & Mathis

[57] ABSTRACT

A system is disclosed wherein fibers are mounted on pallets for ease in handling and storage. The system uses the pallets to provide a continuous, uniform rate of fiber feed to other apparatus for subsequent fiber processing. A positioning system arranges pallets in end-to-end abutting relationship to provide the uniform rate of fiber feed generally desired for fiber processing. A plurality of vertically spaced horizontally disposed rotating augers engage the advancing face of fibers on a pallet to remove the bulk of fibers therefrom. The pallet surface is subsequently engaged by a pallet sweeper which removes any fibers not removed by the rotating augers. The loosened fibers are deposited on a transverse conveyor which overlies the pallet surface and moves the fibers transversely of the pallet unloading apparatus for delivery to the fiber processing apparatus.

11 Claims, 5 Drawing Figures

PATENTED JUL 29 1975　　3,897,018

SHEET 3

METHOD AND APPARATUS FOR THE CONTINUOUS FEEDING OF PALLETIZED FIBER MATERIALS

BACKGROUND OF THE INVENTION

1. Field of the Invention

The invention relates to the continuous feeding of fiber materials, such as seed cotton, to fiber processing apparatus, such as a cotton gin.

2. Description of the Prior Art

Normally, cotton is picked by a mechanical harverster and collected in a large basket or bin on the harvester. When the basket is full, it is dumped into a wagon for transportation to a cotton gin. Since cotton is transported to the gin soon after being picked, the gins are operated at full capacity during the harvesting season. Accordingly, the gin is comparatively idle between ginning seasons.

The use of mechanical harvesters has decreased harvest season length and increased the rate of seed cotton flowing to the gin. This increased flow of seed cotton to the gin has required higher capacity, more efficient ginning operations.

High capacity cotton gins present a difficult problem in obtaining an economical seed cotton unloading system. In an article by Oliver M. McCaskill and Eugene G. Columbus entitled "Mechanical Seed Cotton Unloading System," June 1968, United States Department of Agriculture, Agricultural Research Service, ARS, 42–144, several experimental gin feeding systems are disclosed which provide improved seed cotton feed rate. Generally, the authors describe a feeding system in which specially designed side dump trailers are loaded with seed cotton in the field. The side dump trailers empty into a hopper which is sized in accordance with the dimensions of the dump trailer. Cotton is conveyed from the hopper to breaker cylinders where it is fed to subsequent processing apparatus. One particular problem of these experimental systems discussed by McCaskill et al. is that of an uneven feed rate of cotton from the hopper. The McCaskill et al. article also summarizes many problems with prior art feeding devices.

U.S. Pat. No. 3,749,003, issued to Lambert H. Wilkes and Joseph K. Jones on July 31, 1973, discloses a mechanized seed cotton handling apparatus wherein seed cotton from mechanical harvesters is compacted onto a pallet. The pallet, with its compacted seed cotton, may be transported by conventional trucks to the cotton gin. In addition to reduced storage space required by compressed cotton, the pallet system makes possible high density feeding for cotton gins. Gin feeding systems, however, have not been designed to accommodate high density feeding made possible to the pallet system. Accordingly, the pallets have generally been unloaded by workmen manhandling the conventional suction pipe used to feed cotton gins.

The invention discloses an efficient, relatively inexpensive apparatus for supplying fibers to fiber processing apparatus, especially seed cotton to cotton gins. Seed cotton, or the like, arrives at the gin on pallets which may be covered, for example, with tarpaulins and then stored for later use to effectively stretch out the high volume ginning season. Alternately, the seed cotton may be promptly fed to the gin and the inexpensive pallets returned to the field for reuse.

SUMMARY OF THE INVENTION

The process of this invention begins by translating cotton-laden pallets longitudinally along a generally horizontal supporting surface at a uniform continuous rate determined by the rate at which fibers are to be consumed by subsequent processing apparatus. The bulk of fibers on a pallet are removed and the pallet surface is then swept clean of remaining fibers. Fibers thus removed are piled upon a conveyor for movement to the subsequent processing apparatus.

The apparatus of this invention includes a generally horizontal bed along which fiber-laden pallets are translated from a loading zone to a discharge zone. The fibers on each pallet are engaged by rotary breakers which loosen and remove the bulk of the fibers from each pallet. Loosened fibers are discharged from the horizontal bed by a conveyor system to the subsequent processing apparatus.

BRIEF DESCRIPTION OF THE DRAWINGS

The detailed description of a preferred embodiment of this invention which follows includes reference to the drawings in which.

DETAILED DESCRIPTION OF THE INVENTION

Figure 1:
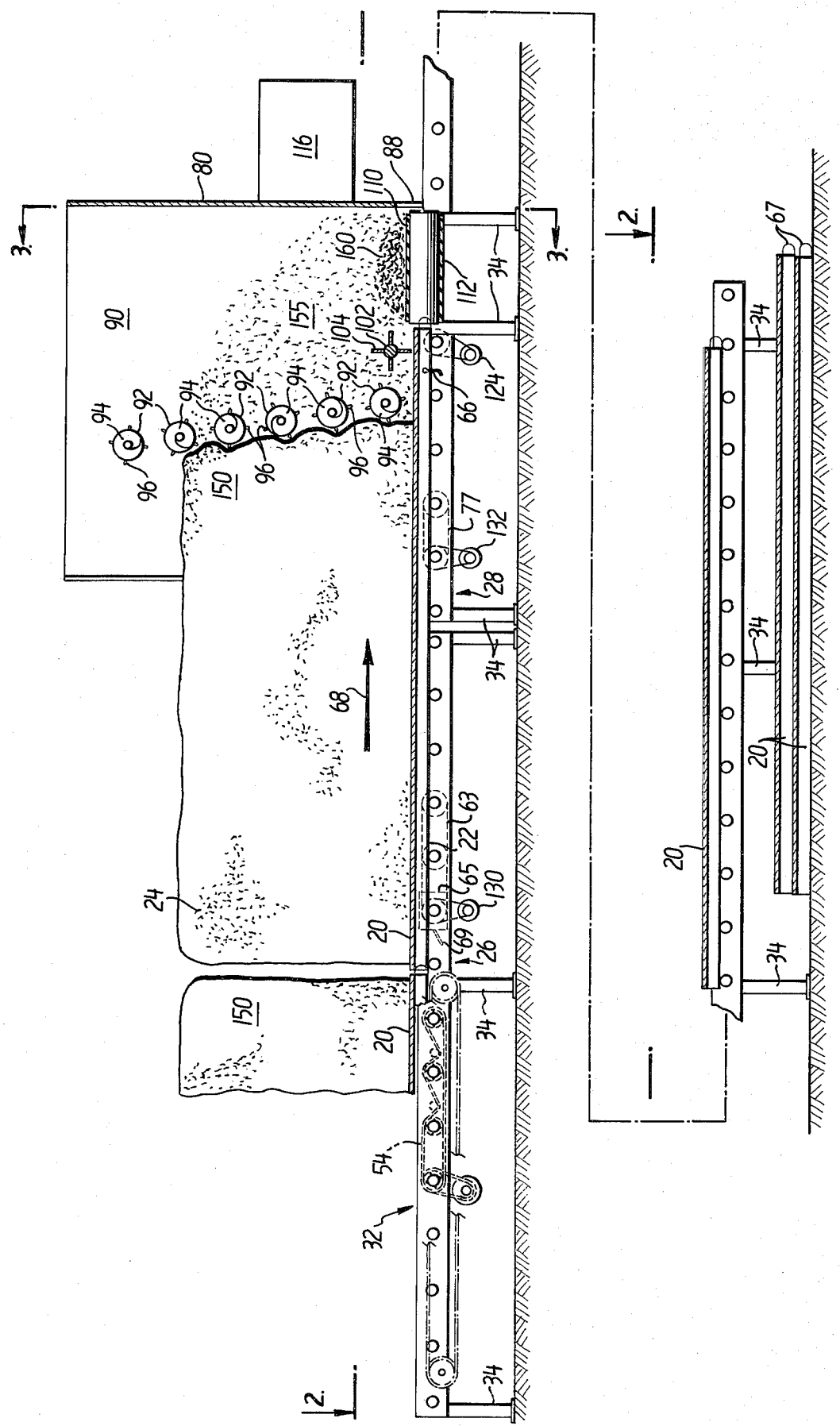
FIG. 1 is a longitudinal cross-sectional view of the apparatus.
Figure 3:
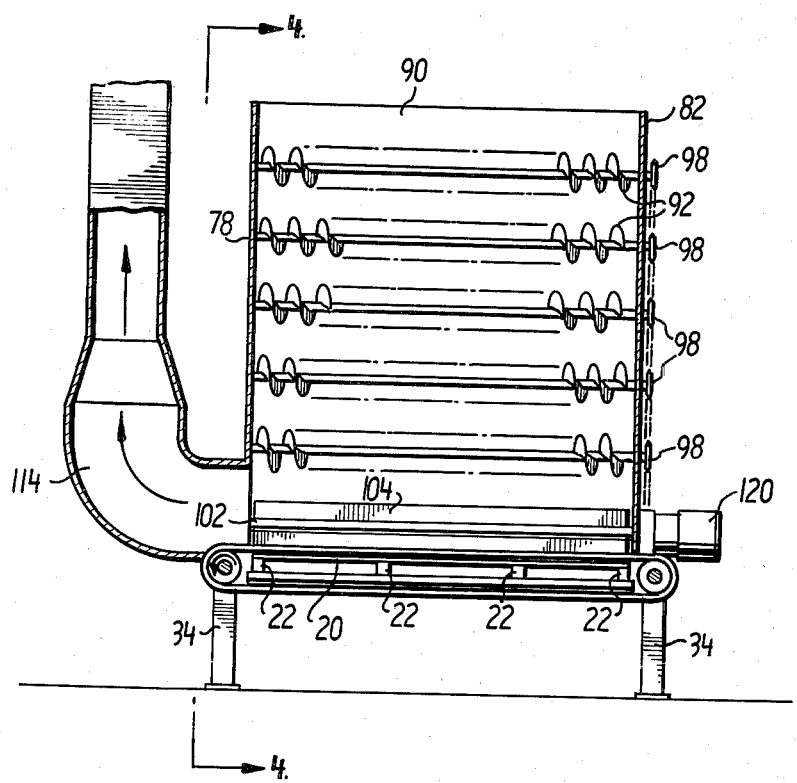
FIG. 3 is a cross-sectional view along lines 3—3 of FIG. 1.

The general overall spatial relationship between the various elements of a fiber unloading apparatus is disclosed in FIG. 1. Fibers are fed to the apparatus on any suitable pallet such as that illustrated in FIG. 1. 1. Each pallet 20 may be fabricated from one or more sheets of plywood, for example, wood, metal or any other suitable material. The pallet 20 may be provided with a plurality of transversely-spaced longitudinal stiffening elements 22 as illustrated in FIG. 3. Each pallet 20 has been loaded with fibers 24 which are removed therefrom and fed to fiber processing apparatus by the fiber unloading apparatus. The fibers may be seed cotton which has been compressed for storage on pallet 20 by any suitable method. One example of a method whereby seed cotton may be compressed on a pallet for storage and subsequent handling is disclosed in U.S. Pat. No. 3,749,003, issued July 31, 1973, to Lamber H. Wilkes and Joseph K. Jones.

The apparatus herein disclosed is, of course, suitable for handling any fiber material which may be placed on pallets for storage and/or handling. It will be appreciated by those skilled in the art that the fibers 24 may or may not be compressed while stored on the pallets 20. Moreover, it will be appreciated from the following description that the pallets 20 need not be of a uniform length. The apparatus herein disclosed can readily accommodate pallets of different lengths with the same efficient operation.

The fiber unloading apparatus comprises a bed means such as a generally horizontal bed 32 on which the fiber-laden pallets 20 are longitudinally translated.

The horizontal bed 32 disclosed in FIG. 1 comprises a pallet feeder 26, a pallet unloader 28, and a pallet stacker 30. The horizontal bed 32 is provided with a plurality of legs 34 which may be adjustable to obtain the generally horizontal alignment between the pallet feeder 26, the apllet unloader 28 and the pallet stacker 30. The horizontal bed 32 is provided with a loading zone at one end which zone receives pallets 20 one at a time and positions the pallet relative to previously loaded pallets. In addition, the horizontal bed 32 includes a discharge zone where empty pallets are removed.

Figure 2:
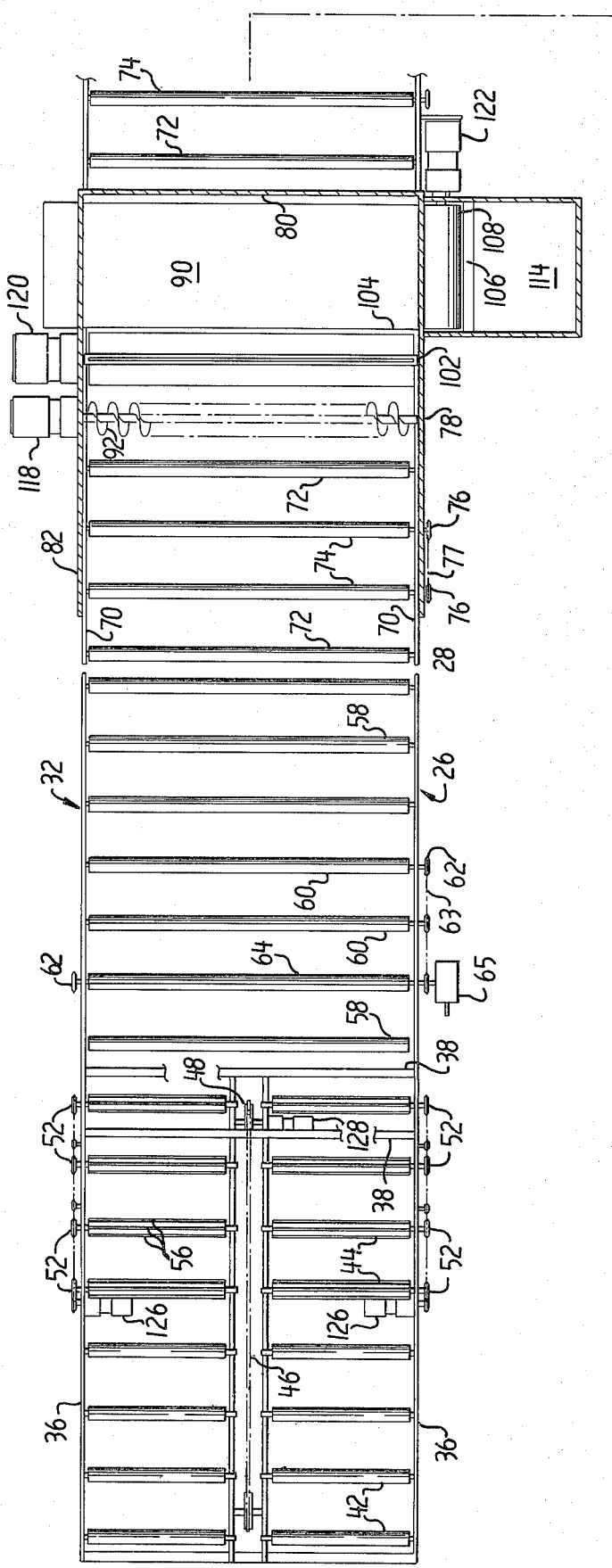
FIG. 2 is a cross-sectional view along line 2—2 of FIG. 1 with the pallet removed for the sake of clarity.
Figure 2:
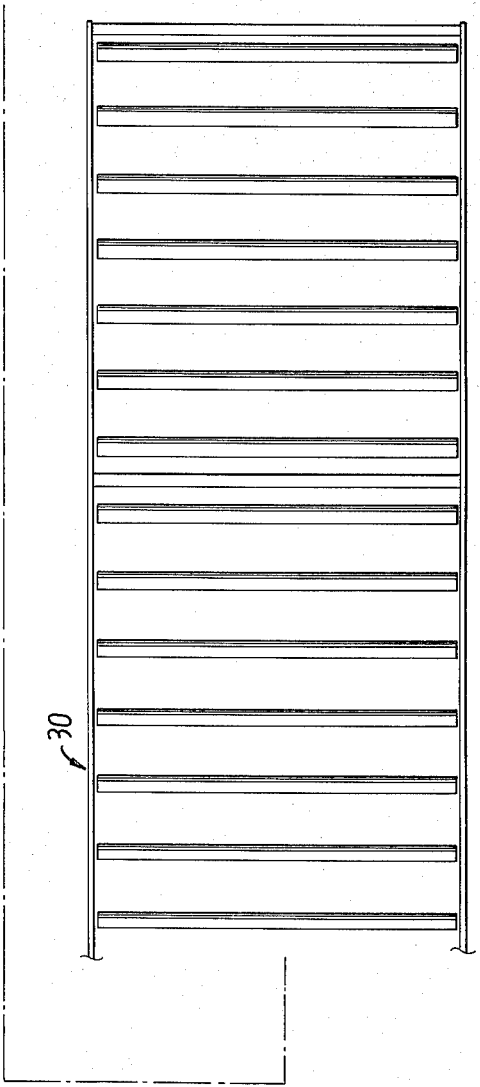

The pallet feeder 26 of the apparatus includes a pair of longitudinal side rails 36 which are held in spaced relationship by suitable cross members such as 38. The pallet feeder 26 also includes a pair of interior longitudinal rails 40 which are spaced from one another as shown in FIG. 2. A plurality of short idling rollers 42 are disposed between each longitudinal side rail 36 and the interior longitudinal rail 40 adjacent thereto. Each of the short idling rollers 42 is supported at one end by a longitudinal side rail 36 and at the other end thereof by an interior longitudinal rail 40. Also disposed between the longitudinal side rails 36 and the interior longitudinal rails 40 are a plurality of short powdered rollers 44. The short powered rollers 44 constitute a portion of a loading conveyor system which is driven at a first predetermined speed to translate pallets 20 longitudinally along the horizontal bed 32 and the pallet feeder 26. It will be noted from FIG. 2 that the short powered rollers 44 are positioned such that a pallet 20 engages the short powered rollers 44 only after it has been initially positioned on the short idling rollers 42 of the generally horizontal bed 32.

Since it is advantageous to move the pallets 20 along the generally horizontal bed 32 in a manner such that a continuous flow of fibers will be supplied to the fiber processing apparatus, it is desirable to maintain the pallets 20 in end-to-end abutting relationship. Accordingly, a positioning conveyor means is provided to position the pallets 20 on the pallet feeder 26. The positioning conveyor means includes an endless chain 46 which is driven by a powered sprocket 48. An idling sprocket 50 is also provided for support of the endless chain 46 at one end of the horizontal bed 32. Both the powered sprocket 48 and the idling sprocket 50 are disposed in a space defined between the interior longitudinal rails 40. The endless chain 46 may be driven at a variable speed, to be described more fully hereinafter, to bring a pallet 20 into engagement with the loading conveyor system. The above-noted loading zone thus includes the positioning conveyor means, the short powered rollers 44 and the short idling rollers 42.

Each of the short powered rollers 44 is provided with a driving sprocket 52 at one end thereof. The rotational rate of the short powered rollers 44 is constrained to a uniform value by interconnecting the driving sprockets 52 thereof by a drive chain 54. To facilitate driving engagement between the short powered rollers 44 and the bottom surface of pallets 20, each of the short powered rollers 44 is provided with an engagement means such as a plurality of longitudinal ribs 56. It will be appreciated by one skilled in the art that any other suitable engagement means may be provided on the short powered rollers 44 to facilitate driving engagement with the bottom surface of pallets 20.

The pallet feeder 26 may also include a plurality of long idling rollers 58 which are supported on each end by the longitudinal side rails 36. In addition, the pallet feeder 26 includes a plurality of long powered rollers 60 which comprise a transition conveyor means. Each long powered roller 60 is provided with a driving sprocket 62 at one end thereof and may be provided with an engagement means 64 to facilitate driving engagement with the bottom surface of a pallet 20.

The driving sprockets 62 of the transition conveyor means are drivingly interconnected by chain 63. Chain 63 is in turn driven by a two-speed clutch 65. A handle 69 provided on clutch 65 permits the transition conveyor to move pallets 20 at a first predetermined speed or at a second predetermined speed. The first predetermined speed corresponds to the predetermined speed at which the loading conveyor moves pallets. The second predetermined speed is slower than the first predetermined speed to enable the positioning conveyor means, the loading conveyor means and the transition conveyor means to position pallets 20 in end-to-end abutting relationship with previously positioned pallets.

Figure 5:
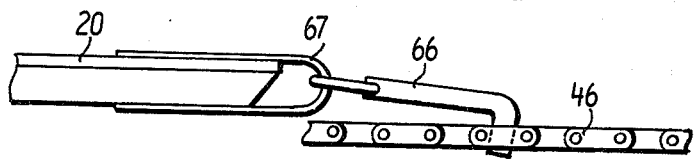
FIG. 5 is a detail of the engagement between a pallet and the positioning conveyor.

A pivotally mounted hook 66 is provided for each pallet 20. Each hook 66 is connected to a strap 67 provided therefor at one end of each pallet 20. The hook 66 is engaged by the endless chain 46 to facilitate the initial positioning of a pallet 20 on the pallet feeder 26. The relationship of hook 66 and chain 46 is best illustrated by FIG. 5.

When pallets 20 have been properly positioned on the horizontal bed 32 and are translating in the direction shown by arrow 68 of FIG. 1, pallets 20 leave the pallet feeder 26 and enter the pallet unloader 28 which includes a pair of longitudinal side rails 28 that are rigidly spaced in any suitable manner such as by cross members. A plurality of idling rollers 72 are rotatably supported at each end by one of the longitudinal side rails 70. Similarly, two or more powered rollers 74 are supported rotatably at each end by the longitudinal side rails. The powered rollers 74 are part of a feed conveyor means which translates pallets 20 in abutting relationship at the second predetermined speed. Generally, the powered rollers 74 are spaced adjacent to one another along the horizontal bed 32 and are provided with a driving sprocket 76 at one end. The driving sprockets 76 are drivingly interconnected by a chain 77.

The pallet unloader 28 includes a first vertical wall 78 which is attached to one of the longitudinal side rails 70. A second vertical wall 80 is connected at one end of the first vertical wall 78 and is transversely disposed between the pair of longitudinal side rails 70. A third vertical wall 82 is disposed parallel to the first vertical wall and is positioned on the second longitudinal side rail 70. The three vertical walls 78, 80, 82 define an entrance 86 through which fiber-laden pallets 20 enter a chamber 90 defined therebetween. The first vertical wall 78 is provided with a fiber egress opening 84. The second vertical wall 80 is spaced vertically above the horizontal bed 32 to define a pallet egress opening 88 as clearly seen in FIG. 1.

Disposed within chamber 90 is a breaker means which includes a plurality of rotary members 92. The rotary members 92 are suitably rotatably mounted at one end in vertical wall 78 and suitably rotatably mounted at the second end thereof in vertical wall 82. Each rotary member 92 is horizontal and is transverse to the horizontal bed 32. Moreover, each rotary member 92 is spaced vertically above the horizontal bed 32 and spaced vertically from the other rotary members. Each rotary member is provided with a spiral auger blade 94 and a plurality of spikes 96. The spikes 96 and auger blades 94 facilitate the removal of fibers 24 from a from a pallet 20 as will be described more fully hereinafter.

Figure 4:
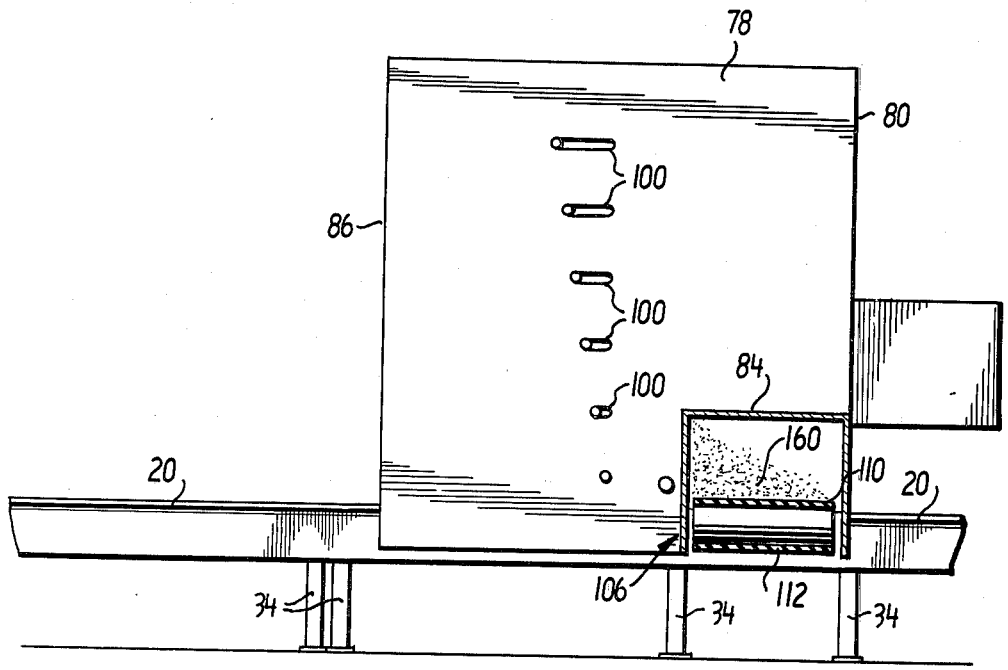
FIG. 4 is a cross-sectional view taken along line 4—4 of FIG. 3.

The positioning of horizontal adjustment slots 100 in vertical wall 78 is illustrated in FIG. 4. A similar arrangement of adjustment slots is provided in vertical wall 82. The slots 100 permit horizontal positioning of rotary members 92 while maintaining the vertical spacing therebetween. Each rotary member 92 has a driving sprocket 89 at one end thereof which is drivingly interconnected with driving sprockets 98 of the other rotary members 92 such that each rotary member 92 rotates at a uniform angular velocity.

Also disposed within chamber 90 is a rotary sweeper 92. The rotary sweeper 92 is transversely positioned with respect to the horizontal bed 32 and includes a plurality of radially-aligned sweeping blades 104 which engage the upper surface of each pallet 20 and remove any fibers 24 remaining thereon after the pallet 20 has passed under the plurality of rotary members 92. The rotary sweeper 92 rotates such that the lowermost sweeping blade 104 moves in a direction opposite to that of arrow 68.

A transverse conveyor 106 is also provided within chamber 90. In the preferred embodiment, the transverse conveyor 106 includes an endless belt 108 having an upper moving surface 110 and a lower moving surface 112. At this point it should be noted that the transverse conveyor might be comprised of other suitable conveying systems including an auger system or screw conveyor system. One end of the transverse conveyor 106 protrudes through the fiber egress opening 84 and into a suction chamber 114; the other end of transverse conveyor 106 protrudes slightly through wall 82. The continuously moving endless belt 108 conveys fibers 160, which pile thereupon, transversely with respect to the horizontal bed 32 and deposits the fibers in suction chamber 114 wherein a current of air entrains the fibers and conveys them to the subsequent fiber processing apparatus. The upper moving surface 110 of the endless belt 108 is disposed with the chamber 90 such that each pallet 20 passes between the upper moving surface 110 and the lower moving surface 112 after the pallet has been swept by rotary sweeper 92 and prior to leaving the chamber 90 through pallet egress opening 88.

As a pallet 20 emerges from chamber 90 through pallet egress opening 88, the pallet proceeds to a pallet stacker 30. The pallet stacker 30 stacks pallets 20 for subsequent reuse and may be any conventional apparatus suitable for the purpose. The pallet egress opening 88 and the pallet stacker 30 are thus parts of the above-mentioned pallet discharge zone.

It will be noted that although only three vertical walls 78, 80, 82 are provided, fibers loosened and removed by rotary members 92 are inhibited from spilling out of the top of chamber 90 by two effects. The first is gravity which creates a natural tendency for the fibers to descend through chamber 90 toward transverse conveyor 106. The second is the current of air which is sucked into suction chamber 114 through fiber egress opening 84. The suction in chamber 114 creates a flow of air generally downward through chamber 90 which engrains thefibers loosened the fibers rotary members 92.

To drive the rotating parts of the pallet unloading apparatus herein described, a hydraulic pump and control system 116 may be attached, for example, to vertical wall 80. Suitable hydraulic motors may be provided as necessary to drive the rotating parts. For example, hydraulic motor 118 may be provided to drive rotary members 92, hydraulic motor 120 for the pallet sweeper 106 and hydraulic motor 122 for the transverse conveyor 106. Each of the short powered roller systems may be provided with a hydraulic motor 126 to drive each drive chain 54. Similarly, a hydraulic motor 128 may be provided to drive the endless chain 46. Likewise, hydraulic motor 130 is provided to drive the transition conveyor means through clutch 65 and hydraulic motor 132 is provided to drive feed conveyor means through drive chain 77. Suitable controls may be provided to separately control the hydraulic motors driving the positioning conveyor means, the loading conveyor means, the transition conveyor means and the feed conveyor means. The second predetermined speed is determined by the capacity of the fiber treatment apparatus to which the pallet unloading apparatus is connected by means of the suction chamber 114 and may be adjusted according to the type of fiber processing apparatus being supplied. Typically, the first predetermined speed may be on the order of 15 feet/minute and the second predetermined speed may be on the order of 2 feet/minute.

It would, of course, be possible to use electric motors with suitable transmissions or any other suitable power devices to drive the rotating portions of the apparatus herein described.

In addition, it would be possible to use the pallet unloading apparatus herein described in combination with fiber processing apparatus not fed by an air current having entrained fibers. In this situation, fibers carried from chamber 90 by the transverse conveyor 106 might be deposited directly within the fiber inlet of fiber processing apparatus. In the case of seed cotton fed to a cotton gin, the seed cotton may be fed directly to the hot air stream of the gin.

In operation, the leading edge of a pallet 20 having fibers 24 disposed thereon is first engaged by the endless chain 46. Hook 66 of a pallet 20 is connected with endless chain 46 as shown by FIG. 5. The chain 46 is then driven to pull pallet 20 over short idling rollers 42 to the short powered rollers 44 of the loading conveyor means. When the short powered rollers 44 engage the newly-positioned pallet, the hook 66 is disconnected from the endless chain 46 which may then be used to position a subsequent pallet.

After the endless chain 46 has been used to position the pallet 20, the short powered rollers 44 convey the fiber-laden pallets at the first predetermined speed longitudinally along the horizontal bed 32 to the transition conveyor means which is operating at the first predetermined speed. When the pallet 20 is in abutment with a previously loaded pallet, clutch 65 permits the transition conveyor to change speed to the second predetermined speed. As pallet 20 advances to the feed conveyor, the speed of the transition conveyor may be changed back to position a subsequent pallet. The feed conveyor translates the pallet through the unloading portion 28.

The leading end 150 of fibers 24 disposed on a pallet 20 is first engaged by the plurality of vertically disposed, horizontal rotary members 92. The fibers 24 are then loosened from the advancing end 150 by the rotating spikes 96 and the spiral blades 94 of rotary members 92. The interaction of the rotating spikes 96 and spiral blades 94 eliminates aggregations of fibers. Loosened fibers 155 generally fall into a pile 160 on transverse conveyor 106. Any fibers 24 which are not loosened and removed from the pallet by the rotating members 92 are swept from the pallet surface by the rotary sweeper 102. The pallet passes below the upper moving surface 110 of the transverse conveyor 106 and thereby does not collect any of the loosened fibers 155. The loosened fibers 155 which have coalesced into a pile 160 on the endless belt 108 of transverse conveyor 106 are moved transversely of the horizontal bed 32 toward a suction chamber 114. An air current removes the fibers from the suction chamber 114 for subsequent processing. The pallet 10, having the fibers 24 removed therefrom, passes out of chamber 90 through pallet egress opening 88 and is stacked by pallet stacker 30 for subsequent use.

At this point it will also be apparent that the pallet feeder portion 26 may be used independently of the pallet unloader 28 if a conventional gin suction tube is used to unload pallets 20. In this case, the pallet feeder would permit economical feeding of a gain by eliminating the time wasted for trucks to off-load their cargo of fibers.

The fiber-laden pallet unloading system described above has numerous advantages not heretofore available.

One advantage is the accommodation of pallets which have different lengths. This advantage is made possible by the long horizontal bed that supports the pallets and the abutting end-to-end positioning of the pallets.

Another advantage is the continuous feeding of fibers at a constant rate to subsequent processing apparatus which results from the end-to-end abutting relationship between pallets and the constant translational speed of the pallets on the horizontal bed.

Another advantage is the reduction of the number of workmen otherwise required to feed apparatus such as a cotton gin. This reduction is made possible by the mechanized pallet unloading apparatus which eliminates manhandling of a gin feeder suction tube.

A further advantage is that fiber-laden pallets may be stored during peak harvesting periods and processed at a later time thereby effecting a more continuous, and effective, use of expensive fiber processing machinery. In addition, the capacity required in fiber processing apparatus is reduced as a result of the longer period of time during which fiber processing may now be conducted.

When seed cotton is compressed on pallets and removed therefrom for ginning, the above apparatus has an additional advantage in that the rotating augers cause strain on individual "locks" of cotton during the pallet unloading process and thus aids the ginning process.

The use of easily fabricated, inexpensive pallets provides a further advantage in that capital expenditures for specially designed truck bodies are substantially eliminated in contrast to some prior-air gin-feeding apparatus.

The foregoing description discloses the preferred embodiment of the invention but does not in any way comprise a limitation of the scope of the claims appended hereto. Accordingly, the scope of the invention is defined by the claims and all modifications and equivalents thereof are intended to be included within the scope of the claims.

What is claimed is:

1. Apparatus for removing fibers stacked on a pallet comprising:
   a generally horizontal bed means having a supporting surface for at least one pallet, having a loading zone at one end thereof and having a discharge zone;
   breaker means for breaking loose fibers stacked on a pallet, said breaker means disposed above said bed means to allow pallets on said supporting surface to pass under said breaker means;
   means supported by said bed means for supporting and translating a pallet from said loading zone to a position on the opposite side of said breaker means, whereby fibers stacked on the pallet are engaged by said breaker means and broken away from the rest of the fibers carried on the pallet as the pallet passes under and beyond said breaker means; and
   discharge means above said bed means, said discharge means for conveying fibers removed from a pallet by said breaker means to subsequent fiber handling apparatus.

2. The apparatus of claim 1 wherein:
   said means for translating includes a feed conveyor which is driven at one predetermined speed for translating pallets from said loading zone to said discharge zone of said bed means at a uniform speed in abutting, end-to-end relationship.

3. The apparatus of claim 2 wherein:
   said means for translating includes a transition conveyor disposed within said loading zone of said bed means, said transition conveyor operable at variable speed for loading a pallet onto said feed conveyor in end-to-end abutting relationship with a previously loaded pallet for subsequent uniform translation by said feed conveyor.

4. The apparatus of claim 3 wherein:
   said feed conveyor includes a plurality of power rollers transversely disposed in relation to said bed means, said power rollers spaced longitudinally of said bed means; and
   said power rollers including an engagement means for driving engagement with the bottom of a pallet.

5. The apparatus of claim 4 including:
   a loading conveyor operating at a second speed for moving pallets to said transition conveyor; and
   a positioning conveyor for moving pallets to said loading conveyor; said positioning conveyor and said loading conveyor disposed within said loading zone of said bed means.

6. The apparatus of claim 1 wherein:
   said means for removing includes three upright walls, two upright walls being side walls arranged substantially longitudinally of said bed means and the third upright wall being arranged substantially transverse to said bed means and connected to said two side walls such that a chamber is defined therebetween above said bed means;

one of said side walls provided with a fiber egress opening; and said discharge means including a transverse conveyor which removes fibers from said chamber through said opening in said sidewall, said transverse conveyor disposed transverse to said bed means, said transverse conveyor spaced above said bed means such that a palllet moves along said bed means but below said transverse conveyor.

7. The apparatus of claim 6 wherein:
said transverse conveyor includes an endless belt;
said endless belt including a top moving surface and a bottom moving surface, said top moving surface and said bottom moving surface being vertically spaced to allow a pallet translating on said bed means to move therebetween.

8. The apparatus of claim 6 wherein:
said breaking means includes a rotary sweeper for removing fibers disposed adjacent the surface of a pallet, said rotary sweeper disposed transversely of said bed means with said chamber, such that said rotary sweeper engages the pallet before the pallet encounters said transverse conveyor.

9. The apparatus of claim 8 wherein:
said breaking means includes a plurality of horizontal, vertically-spaced, rotary augers, said augers supported be said two side walls above said bed means, said augers positioned such that fibers carried by a pallet are engaged by said augers before the pallet encounters said rotary sweeper.

10. Apparatus for removing fibers from pallet means omprising:
a generally horizontal bed means having a supporting surface for at least one pallet, said bed means having a loading zone at one end and having a discharge zone;
a plurality of powered rollers each having an engaging means for engaging the bottom of a pallet, said powered rollers disposed transverse of said bed means and positioned longitudinally therealong, said powered rollers rotating at one predetermined constant speed;
a power-driven endless chain disposed within the loading zone of said bed means, said chain disposed longitudinally of said bed means and operable at variable speed for positioning a pallet in end-to-end abutting relationship with a previously positioned pallet for subsequent uniform translatory motion relative to said bed means;
a plurality of upright walls disposed above said bed means and attached thereto, said upright walls defining a chamber having an opening for receiving a fiber-laden pallet, one of said walls including an opening for discharging an empty pallet, and one of said walls including an opening for discharging fibers removed from a pallet;
a plurality of rotary members having a roughened surface for breaking up fibers, said rotary members horizontally disposed transversely of said bed means and vertically spaced thereabove within said chamber;
a rotary sweeper horizontally disposed within said chamber and transverse of said bed means, said rotary sweeper being longitudinally spaced from said rotary members, said rotary sweeper supported by said upright walls in vertically spaced relation to said bed means for allowing a pallet to pass between said rotary sweeper and said bed means such that said rotary sweeper removes any fibers from a pallet not removed by said rotary members;
a transverse conveyor for moving fibers removed from a pallet transversely of said bed means, one end of said transverse conveyor protruding from said chamber through said opening for discharging fibers, said transverse conveyor spaced above said horizontal bed such that an empty pallet may pass therebetween; and
suction means disposed adjacent said protruding end of said tranverse conveyor whereby fibers removed from a pallet are conveyed for subsequent processing.

11. The apparatus according to claim 10 including:
a hydraulic system which powers and controls the rotary speed of said rotary members, said transverse conveyor, said rotary sweeper, said powered rollers and said power-driven endless chain.

* * * * *